United States Patent [19]

Dalla Betta et al.

[11] Patent Number: 5,250,489
[45] Date of Patent: Oct. 5, 1993

[54] CATALYST STRUCTURE HAVING INTEGRAL HEAT EXCHANGE

[75] Inventors: Ralph A. Dalla Betta; Fabio H. Ribeiro, both of Mountain View; Toru Shoji, Sunnyvale, all of Calif.; Kazunori Tsurumi, Fujisawa; Nobuyasu Ezawa, Koto, both of Japan; Sarento G. Nickolas, Livermore, Calif.

[73] Assignees: Catalytica, Inc., Mountain View, Calif.; Tanaka Kikinzoku Kogyo K.K., Japan

[21] Appl. No.: 617,974

[22] Filed: Nov. 26, 1990

[51] Int. Cl.$^5$ .................. B01J 23/40; B01J 23/42; B01J 23/46

[52] U.S. Cl. .................. 502/262; 502/261; 502/327; 502/332; 502/333; 502/334; 502/527; 423/213.5; 431/7

[58] Field of Search ............. 502/527, 261, 262, 327, 502/332, 333, 334; 423/213.5; 431/7

[56] References Cited

U.S. PATENT DOCUMENTS

| | | | |
|---|---|---|---|
| 3,920,583 | 11/1975 | Pugh | 252/465 |
| 3,956,188 | 5/1976 | Hindin et al. | 252/465 |
| 3,966,391 | 6/1976 | Hindin et al. | 431/7 |
| 3,969,082 | 7/1976 | Cairns et al. | 23/288 |
| 3,970,435 | 7/1976 | Schultz et al. | 48/61 |
| 4,008,037 | 2/1977 | Hindin et al. | 431/2 |
| 4,019,969 | 4/1977 | Golebiowski et al. | 204/26 |
| 4,088,435 | 5/1978 | Hindin et al. | 431/7 |
| 4,101,287 | 7/1978 | Sweed et al. | 502/527 X |
| 4,279,782 | 7/1981 | Chapman et al. | 252/465 |
| 4,287,856 | 9/1981 | Enga | 122/4 |
| 4,318,828 | 3/1982 | Chapman | 252/465 |
| 4,331,631 | 5/1982 | Chapman et al. | 422/180 |
| 4,366,668 | 1/1983 | Madgavkar et al. | 60/39.6 |
| 4,414,023 | 11/1983 | Aggen et al. | 75/124 |
| 4,521,532 | 6/1985 | Cho | 502/439 |
| 4,601,999 | 7/1986 | Reallick et al. | 502/314 |
| 4,673,663 | 6/1987 | Magnier | 502/320 |
| 4,731,989 | 3/1988 | Furuya et al. | 60/39.05 |
| 4,742,038 | 5/1988 | Matsumoto | 502/302 |
| 4,752,599 | 6/1988 | Nakamura et al. | 502/257 |
| 4,780,824 | 10/1989 | Young et al. | 60/723 |
| 4,784,984 | 11/1988 | Yamanaka et al. | 502/439 |
| 4,893,465 | 1/1990 | Farrauto et al. | 60/39.02 |

FOREIGN PATENT DOCUMENTS

| | | |
|---|---|---|
| 60-14938 | 1/1985 | Japan . |
| 60-14939 | 1/1985 | Japan . |
| 60-026211 | 2/1985 | Japan . |
| 60-51543 | 3/1985 | Japan . |
| 60-51544 | 3/1985 | Japan . |
| 60-51545 | 3/1985 | Japan . |
| 60-54736 | 3/1985 | Japan . |
| 60-060411 | 4/1985 | Japan . |
| 60-60424 | 4/1985 | Japan . |
| 60-66022 | 4/1985 | Japan . |
| 60-147243 | 8/1985 | Japan . |
| 60-175925 | 9/1985 | Japan . |
| 60-196511 | 10/1985 | Japan . |
| 60-200021 | 10/1985 | Japan . |
| 60-202235 | 10/1985 | Japan . |
| 60-202745 | 10/1985 | Japan . |

(List continued on next page.)

OTHER PUBLICATIONS

Pennline, Henry W., Richard R. Schehl, and William P. Haynes, *Operation of a Tube Wall Methanation Reactor*, Ind. Eng. Chem. Process Des. Dev.: vol. 18, No. 1, 1979.

L. Louis Hegedus, "Temperature Excursions in Catalytic Monoliths", *AIChE Journal*, Sep. 1975, vol. 21, No. 5, 849-853.

Kee et al., "The Chemkin Thermodynamic Data Base", *Sandia National Laboratory Report No. SAND*87-8215, 1987.

(List continued on next page.)

Primary Examiner—W. J. Shine
Attorney, Agent, or Firm—Morrison & Foerster

[57] ABSTRACT

This invention is a catalyst structure having integral heat exchange surfaces and a method for using the structure in highly exothermic processes, such as a combustion process, while maintaining the catalyst and the structure wall at a temperature below the adiabatic combustion temperature.

41 Claims, 5 Drawing Sheets

FOREIGN PATENT DOCUMENTS

| | | |
|---|---|---|
| 60-205115 | 10/1985 | Japan . |
| 60-205116 | 10/1985 | Japan . |
| 60-205129 | 10/1985 | Japan . |
| 60-222145 | 11/1985 | Japan . |
| 60-238148 | 11/1985 | Japan . |
| 61-033233 | 2/1986 | Japan . |
| 61-038627 | 2/1986 | Japan . |
| 61-147014 | 7/1986 | Japan . |
| 61-235609 | 10/1986 | Japan . |
| 61-237905 | 10/1986 | Japan . |
| 61-252408 | 11/1986 | Japan . |
| 60-252409 | 11/1986 | Japan . |
| 61-259013 | 11/1986 | Japan . |
| 62-041511 | 2/1987 | Japan . |
| 62-046116 | 2/1987 | Japan . |
| 62-049125 | 3/1987 | Japan . |
| 62-079847 | 4/1987 | Japan . |
| 62-80419 | 4/1987 | Japan . |
| 62-80420 | 4/1987 | Japan . |
| 62-084215 | 4/1987 | Japan . |
| 62-112910 | 5/1987 | Japan . |
| 62-125210 | 6/1987 | Japan . |
| 62-158910 | 7/1987 | Japan . |
| 62-216642 | 9/1987 | Japan . |
| 62-261803 | 11/1987 | Japan . |
| 63-041720 | 2/1988 | Japan . |
| 63-080847 | 4/1988 | Japan . |
| 63-80848 | 4/1988 | Japan . |
| 63-80849 | 4/1988 | Japan . |
| 63-190644 | 8/1988 | Japan . |
| 63-213723 | 9/1988 | Japan . |
| 63-267804 | 11/1988 | Japan . |
| 1-139911 | 6/1989 | Japan . |

OTHER PUBLICATIONS

Kubaschewski et al., "Metallurgical Thermo-Chemistry", *International Series on Materials Science and Technology*, 5th Edition, vol. 24, 382.

Hayashi et al., "Performance Characteristics of Gas Turbine Combustion Catalyst Under High Pressure", *Gas Turbine Society of Japan*, 1990, 18–69, 55.

CATALYST STRUCTURE HAVING INTEGRAL HEAT EXCHANGE

FIELD OF THE INVENTION

This invention is a catalyst structure having integral heat exchange surfaces and a method for using the structure in highly exothermic processes, such as a combustion process, while maintaining the catalyst and the structure wall at a temperature below the adiabatic combustion temperature.

BACKGROUND OF THE INVENTION

With the advent of modern antipollution laws in the United States and around the world, significant and new methods of minimizing various pollutants are being investigated. The burning of fuel—be the fuel wood, coal, oil, or a natural gas—likely causes a majority of the pollution problems in existence today. Certain pollutants, such as $SO_2$, which are created as the result of the presence of a contaminant in the fuel source may be removed either by treating the fuel to remove the contaminant or by treating the exhaust gas eventually produced. Other pollutants such as carbon monoxide, which are created as the result of imperfect combustion, may be removed by post-combustion oxidation or by improving the combustion process. The other principal pollutant, $NO_x$ (an equilibrium mixture mostly of NO, but also containing very minor amounts of $NO_2$), may be dealt with either by controlling the combustion process to minimize $NO_x$ production or by later removal. Removal of $NO_x$, once produced, is a difficult task because of its relative stability and its low concentrations in most exhaust gases. One ingenious solution used in automobiles is the use of carbon monoxide to reduce $NO_x$ to nitrogen while oxidizing the carbon monoxide to carbon dioxide. However, the need to react two pollutants also speaks to a conclusion that the initial combustion reaction was inefficient.

It must be observed that unlike the situation with sulfur pollutants where the sulfur contaminant may be removed from the fuel, removal of nitrogen from the air fed to the combustion process is an impractical solution. Unlike the situation with carbon monoxide, improvement of the combustion reaction would likely increase the level of $NO_x$ produced due to the higher temperatures then involved.

Nevertheless, the challenge to reduce $NO_x$ remains and several different methods have been suggested. The $NO_x$ abatement process chosen must not substantially conflict with the goal for which the combustion gas was created, i.e., the recovery of its heat value in a turbine, boiler, or furnace.

Many recognize that a fruitful way to control $NO_x$ production is to limit the localized and bulk temperatures in the combustion zone to something less than 1800° C. See, for instance, U.S. Pat. No. 4,731,989 to Furuya et al. at column 1, lines 52–59 and U.S. Pat. No. 4,088,435 to Hindin et al. at column 12.

There are a number of ways of controlling the temperature, such as by dilution with excess air, by controlled oxidation using one or more catalysts, or by staged combustion using variously lean or rich fuel mixtures. Combinations of these methods are also known.

One widely attempted method is the use of multistage catalytic combustion. Most of these processes utilize multi-section catalysts with metal or metal oxide catalysts on ceramic catalyst carriers. Typical of such disclosures are:

| Country | Document | 1st Stage | 2nd Stage | 3rd Stage |
|---------|----------|-----------|-----------|-----------|
| Japan | Kokai 60-205129 | Pt-group/$Al_2O_3$&$SiO_2$ | La/$SiO_2$.$Al_2O_3$ | |
| Japan | Kokai 60-147243 | La&Pd&Pt/$Al_2O_3$ | ferrite/$Al_2O_3$ | |
| Japan | Kokai 60-66022 | Pd&Pt/$ZrO_2$ | Ni/$ZrO_2$ | |
| Japan | Kokai 60-60424 | Pd/- | CaO&$Al_2O_3$&NiO&w/noble metal | |
| Japan | Kokai 60-51545 | Pd/* | Pt/* | $LaCoO_3$/* |
| Japan | Kokai 60-51543 | Pd/* | Pt/* | |
| Japan | Kokai 60-51544 | Pd/* | Pt/* | base metal oxide/* |
| Japan | Kokai 60-54736 | Pd/* | Pt or Pt—Rh or Ni base metal oxide or $LaCO_3$/* | |
| Japan | Kokai 60-202235 | $MoO_4$/- | $CoO_3$&$ZrO_2$&noble metal | |
| Japan | Kokai 60-200021 | Pd&$Al_2O_3$/+* | Pd&$Al_2O_3$/** | Pt/** |
| Japan | Kokai 60-147243 | noble metal/heat resistant carrier | ferrite/heat resistant carrier | |
| Japan | Kokai 60-60424 | La or Nd/$Al_2O_3$ 0.5% $SiO_2$ | Pd or Pt/NiO&$Al_2O_3$& CaO 0.5% SiO | |
| Japan | Kokai 60-14938 | Pd/? | Pt/? | |
| Japan | Kokai 60-14939 | Pd&Pt/refractory | ? | ? |
| Japan | Kokai 61-252409 | Pd&Pt/*** | Pd&Ni/*** | Pd&Pt/*** |
| Japan | Kokai 62-080419 | Pd&Pt | Pd,Pt&NiO | Pt or Pt&Pd |
| Japan | Kokai 62-080420 | Pd&Pt&NiO | Pt | Pt&Pd |
| Japan | Kokai 63-080848 | Pt&Pd | Pd&Pt&NiO | Pt or Pt&Pd |
| Japan | Kokai 63-080849 | Pd,Pt,NiO/? | Pd&Pt(orNiO)/? | Pt or Pd&Pt/? |

*alumina or zirconia on mullite or cordierite
**Ce in first layer; one or more of Zr, Sr, Ba in second layer; at least one of La and Nd in third layer.
***monolithic support stabilized with lanthanide or alkaline earth metal oxide
Note: the catalysts in this Table are characterized as "a"/"b" where "a" is the active metal and "b" is the carrier It is, however, difficult to control the temperatures in these processes. Since the object of each of the processes is to produce a maximum amount of heat in a form which can be efficiently used in some later process, the combustion steps are essentially adiabatic. Consequently, a minor change in any of fuel rate, air rate, or operating processes in an early stage will cause significant changes in the latter stage temperatures. Very high temperatures place thermal strain on downstream catalytic elements.

This list also makes clear that platinum group metals (including palladium) are considered useful in catalytic combustion processes. However, conventional catalytic combustion processes often mix the fuel and air and then pass this mixture over a catalyst with essentially complete combustion in the catalyst bed. This results in extremely high temperatures, typically 1100° C. to 1500° C. For this reason, much of the catalyst development work is directed at catalysts and supports that can withstand those high temperatures and yet remain active. Some have relied on process control schemes in which the flow rate of an intermediate stream of air or fuel is introduced between catalyst stages and is controlled based upon bulk gas temperature. Furuya et al. (mentioned above) describes one approach in circumventing the problems associated with a high catalyst temperature through dilution of the fuel/air mixture with air fed to the catalyst so that the resulting mixture has an adiabatic combustion temperature of 900° C. to 1000° C. This mixture is passed through the catalyst and partial or complete reaction gives a maximum catalyst temperature less than 1000° C. and a gas temperature less than 1000° C. Additional fuel is added after the catalyst and homogeneous combustion of this mixture gives the required temperature (1200° C. to 1500° C.). This process, however, suffers from the need to add fuel at two stages and the requirements to mix this additional fuel with hot gases without obtaining a conventional high temperature diffusion flame and the associated production of $NO_x$.

We have found that a carefully constructed catalyst structure involving self-exchange of combustion heat into the flowing gas is an excellent way to control the temperature of the catalyst and the catalyst support. The metallic supports as we use them are much more flexible in their ability to control heal loads in a reaction and to provide long term chemical and physical stability. Use of such supports eliminates the need for the complicated air dilution procedures such as shown in Furuya et al.

However, the use of metal catalyst supports for platinum group metals has been suggested in passing. See, for instance, U.S. Pat. No. 4,088,435 (to Hindin et al.), "platinum group metals" at column 4, lines 63 et seq., and "the support may be metallic or ceramic. . . " at column 6, line 45. Conversely, the use of a platinum group alloy catalyst on a monolithic support as a combustion catalyst is suggested in U.S. Pat. No. 4,287,856 (to Enga) at column 1, line 65 et al. Other similar disclosures are found in the earlier U.S. Pat. , Nos. 3,966,391; 3,956,188; and 4,008,037 (all to Hindin et al.). Platinum on a steel ("Fecralloy") support as a combustion catalyst for low heating value gas is suggested in U.S. Pat. No. 4,366,668 (to Madgavkar et al.). Other disclosures of metals and metal supports used mainly for automotive catalytic converters include:

| Country | Document | Assignee |
|---|---|---|
| U.S. | 3,920,583 | Pugh |
| U.S. | 3,969,082 | Cairns et al. |
| U.S. | 4,279,782 | Chapman et al. |
| U.S. | 4,318,828 | Chapman et al. |
| U.S. | 4,331,631 | Chapman et al. |
| U.S. | 4,414,023 | Aggen et al. |
| U.S. | 4,521,532 | Cho |
| U.S. | 4,601,999 | Retallick et al. |
| U.S. | 4,673,663 | Magnier |
| U.S. | 4,742,038 | Matsumoto |
| U.S. | 4,752,599 | Nakamura et al. |
| U.S. | 4,784,984 | Yamanaka et al. |
| Great Britain | 1,528,455 | Cairns et al. |

As a group, these patents generally discuss ferritic catalyst supports upon which alumina is found as microcrystals, coatings, whiskers, etc. Many disclose that platinum group metals are suitably placed on those supports as catalysts. None suggest the use of an integral heat exchanger in the catalyst support to aid in the catalyst operation.

Two published Japanese Kokai teach the use of catalyst supports having integral heat exchange surfaces. They are Japanese Kokai 59-136,140 (published Aug. 4, 1984) and Kokai 61-259,013 (published Nov. 17, 1986). The earlier Kokai deals generally with a combustion process using a square-sectioned ceramic monolithic catalytic support in which alternating longitudinal channels (or alternating layers) are shown to have catalysts deposited therein. The monoliths disclosed there are ceramic and are consequently molded, not assembled.

Similarly, the later Kokai discloses a process for the combustion of a fuel gas, in this case a blast furnace off-gas, using a catalyst structure such as that shown in the earlier Kokai or a structure of concentric cylinders in which alternating annular spaces in the support are coated with catalyst. Neither Kokai suggest the use of metal monoliths of any configuration in the processes.

A disclosure very similar to the two Kokai is seen in U.S. Pat. No. 4,870,824 to Young et al.

In summary, although the literature suggests various unrelated portions of the inventive catalyst structure, none of these documents suggests metallic supports produced from a corrugated metal having catalytic material, particularly platinum group metals, deposited only on one side of the corrugated metal which are physically tough and have long term stability.

SUMMARY OF THE INVENTION

This invention is both a catalyst structure suitable for use in a combustion process and a method of using that catalyst structure in a combustion process partially to burn a fuel/air mixture but maintain the catalyst and the catalyst support at a relatively low temperature.

The catalyst structure desirably comprises a support and a combustion catalyst. The support is preferably metal. It may be corrugated and rolled or otherwise assembled in such a way that the combusting gas flows from end to end through the length of the corrugations. The catalyst is placed only on a portion of the corrugations in such a way that the catalyst is in heat exchange relationship to a surface having no catalyst. The heat produced on the catalyst flows thorough the structure wall to the flowing gas at the opposite non-catalytic wall. The heat also flows to the adjacent combusted gas.

The catalyst and its structure provide an exceptionally stable and temperature moderated structure having long life.

DESCRIPTION OF THE INVENTION

This invention is a catalyst structure which is particularly useful in fuel combustion processes and the fuel combustion processes. The structure is preferably a platinum-group, metal-based catalyst on a metal monolith. The metal monolith is assembled from or fabricated from metallic materials having a catalytic surface and an adjunct non-catalytic surface. One side of the catalyst structure component has catalyst upon it and the other side of the catalyst structure component is essentially catalyst-free.

The preferred supports for this catalytic zone are metallic. Metallic supports in the form of honeycombs, spiral rolls of corrugated sheet (which may be interspersed with flat separator sheets), columnar (or "handful of straws"), or other configurations having longitudinal channels or passageways permitting high space velocities with a minimal pressure drop are desireable in this service. They are malleable, may be mounted and attached to surrounding structures more readily, and offer lower flow resistance due to walls which are thinner than can be readily manufactured in ceramic supports. Another practical benefit atributable to metallic supports is the ability to survive thermal shock. Such thermal shocks occur in gas turbine operations when the turbine is started and stopped and, in particular, when the turbine must be rapidly shut down. In this latter case, the fuel is cut off or the turbine is "tripped" because the physical load on the turbine—e.g., a generator set—has been removed. Fuel to the turbine is immediately cut off to prevent overspeeding. The temperature in the combustion chambers, where the inventive process takes place, quickly drops from the temperature of combustion to the temperature of the compressed air. This drop could span more than 1000° C. in less than one second.

In any event, the catalyst is deposited, or otherwise placed, on at least a portion of the walls within the metal supports' channels or passageways in the amounts specified. By the phrase "at least a portion" is meant that each channel need not be coated along its entire length. In some instances catalyst placement along a portion of the length of the channel will be sufficient. Several types of support materials are satisfactory in this service: aluminum, aluminum-containing or aluminum-treated steels, ferrous alloys, certain stainless steels, or any high temperature metal alloy, including nickel or cobalt alloys where a catalyst layer can be deposited on the metal surface.

The preferred materials are aluminum-containing steels such as those found in U.S. Pat. Nos. 4,414,023 to Aggen et al. 4,331,631 to Chapman et al., and 3,969,082 to Cairns et al. These steels, as well as others sold by Kawasaki Steel Corporation (River Lite 20-5 SR), Vereinigte Deutchse Metallwerke AG (Alumchrom I RE), and Allegheny Ludlum Steel (Alia-IV), contain sufficient dissolved aluminum so that, when oxidized, the aluminum forms alumina whiskers, crystals, or a layer on the steel's surface to provide a rough and chemically reactive surface for better adherence of the washcoat.

The washcoat may be applied using an approach such as is described in the art, e.g., the application of gamma-alumina, zirconia, silica, or titania materials (preferably sols) or mixed sols of at least two oxides containing aluminum, silicon, titanium, zirconium, and additives such as barium, cerium, lanthanum, chromium, or a variety of other components. For better adhesion of the -washcoat, a primer layer can be applied containing hydrous oxides such as a dilute suspension of pseudo-boehmite alumina as described in U.S. Pat. No. 4,229,782 to Chapman et al. The primed surface may be coated with a gamma-alumina suspension, dried, and calcined to form a high surface area adherent oxide layer on the metal surface. Most desirably, however is the use of a zirconia sol or suspension as the washcoat. Other refractory oxides, such as silica and titania, are also suitable. Most preferred for some platinum group metals, notably palladium, is a mixed zirconia/silica sol where the two have been mixed prior to application to the support. Silica appears to allow the zirconia to maintain the catalyst's stability (e.g., its activity) for a long period of time.

The washcoat may be applied in the same fashion one would apply paint to a surface, e.g., by spraying, direct application, dipping the support into the washcoat material, etc.

Aluminum structures are also suitable for use in this invention and may be treated or coated in essentially the same manner. Aluminum alloys are somewhat more ductile and likely to deform or even to melt in the temperature operating envelope of the process. Consequently, they are less desireable supports but may be used if the temperature criteria can be met.

Figure 1A:
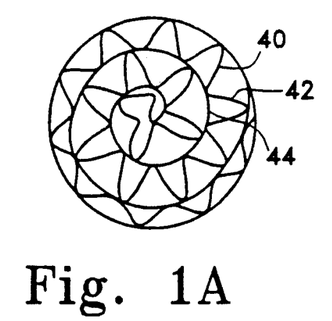
FIGS. 1A, 1B, 1C, 2A, and 2B schematically depict various forms of the inventive catalyst structure.
Figure 1B:
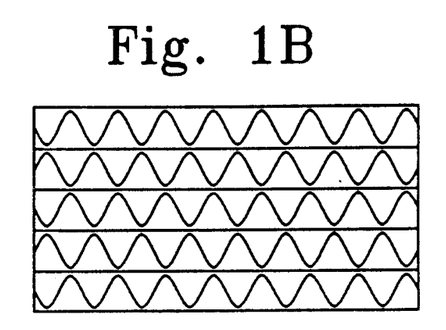
Figure 1C:
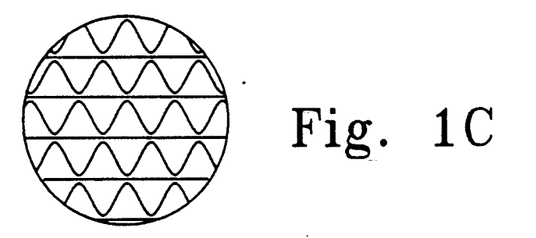
Figure 2A:
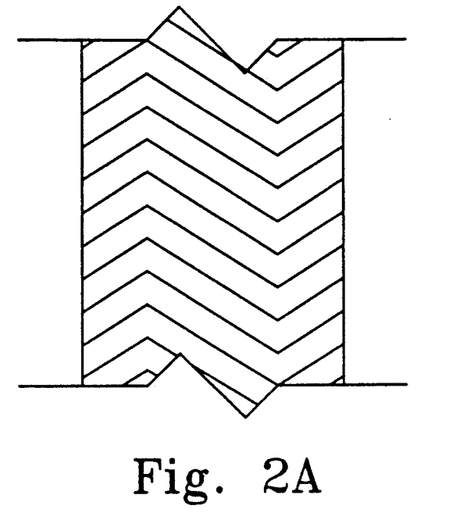
Figure 2B:
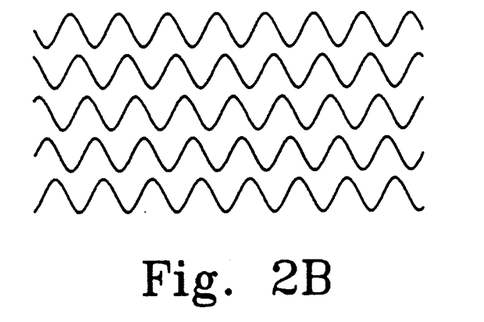

Typical structures for this inventive catalyst are shown in the drawings. A metal sheet in the form of a long strip is corrugated in a cold rolling or other processing operation. This corrugated strip may be combined with a flat metal strip and rolled in a spiral to form a cylindrical catalyst structure through which gas can flow. The end view of this structure is shown in FIG. 1A where the gas flow passages are straight channels. Rather than rolling, the corrugated and flat (or spacer) strips can be cut or folded and layed together to form structures such as seen in FIG. 1B and FIG. 1C. Alternatively, Chapman et al. in U.S. Pat. No. 4,331,631 teaches the use of a herringbone corrugation pattern as shown in plan view in FIG. 2A that, when folded or doubled and rolled into a spiral, will form an open corrugated structure without the use of a flat metal strip and will not nest as shown in FIG. 2B. Other similar metal structures may be formed from a variety of metal sheet structures and are useful in this invention.

Figure 3A:
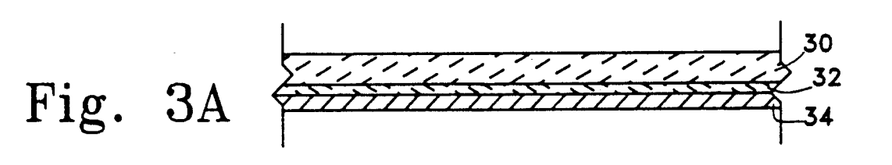
FIGS. 3A and 3B depict the operation of the structure.

Critical to this invention is the application of a catalytic material only to one side of the metal forming the support structure as shown in FIG. 3A where the washcoat and catalytic materials are applied as a thin layer to the metal foil surface using procedures well known in the art. For ferrous metals containing aluminum, the sheet may be heat treated in air to grow whiskers at the surface that increase adhesion of subsequent layers or provide increased surface area for direct application of a catalyst. A silica, alumina, zirconia, titania, or refractory metal oxide may then be applied by spraying onto the metal foil a solution, suspension, or other mixture of alumina, silica, zirconia, titania, or other refractory metal oxide, more particularly a mixture of at least two of alumina, silica, zirconia, titania and other refractory metal oxide, and drying and calcining to form a high surface area washcoat. A mixture suitable for the washcoat is a mixture of zirconia and silica. The catalyst can then be applied, again such as by spraying a solution, suspension, or mixture of the catalytic components onto the washcoats on the metal strip.

The catalytic material may also or alternatively be included in the washcoat material and coated onto the support thereby partially eliminating the separate catalyst inclusion step.

Figure 3B:
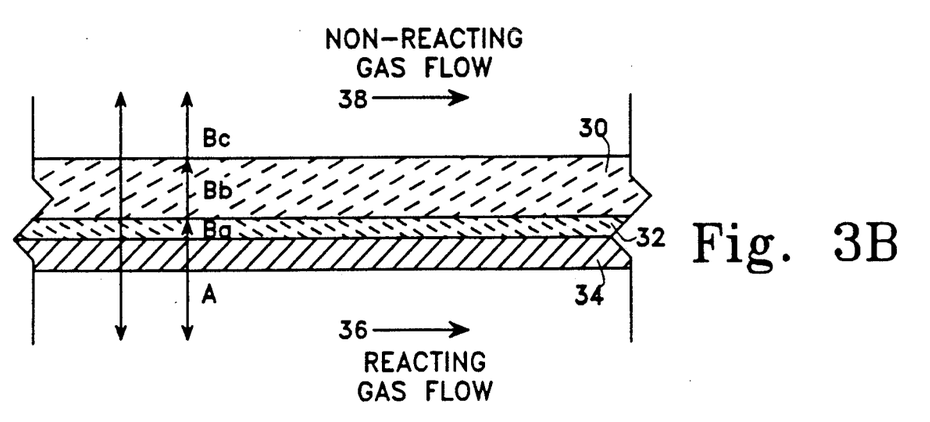

Coating a metal foil with catalyst on only one side provides a catalytic surface with a very efficient heat exchange mechanism to the non-catalyzed opposite surface. For instance, in the structure in FIG. 3B, the metal foil (30) is coated on one side with the oxide washcoat (32) and catalyst (34). This structure forms the walls of the channels formed by the corrugated and flat metal foils described in FIGS. 1A–1C and 2A–2B. The gas flowing past the catalytic surface (34) in FIG. 3B results in reaction of the fuel and oxygen to generate heat. This heat is conducted into the gas stream (36) as well as through the metal oxide layer (32) and through the metal foil or sheet (30) to the gas stream (38) flowing on the opposite side of the metal wall. Since this surface has no catalytic coating, the gas is heated only by heat conducted from the catalytic coated surface on the opposite side of the metal substrate wall. The heat transfer coefficients for these two pathways, A and B, can be calculated using routine chemical engineering practice and correlations for a heat transfer between flowing gas and an adjacent solid surface according to, e.g., Whitaker, *Fundamental Principles of Heat Tranfer*, (1983). pp. 13–15. For heat generated at the washcoat surface near the washcoat/gas interface, the terms are:

$$1/U_A = 1/h_{gas\,film}$$

$$1/U_B = 1/h_{gas\,film} + 1/h_{metal\,foil} + 1/h_{washcoat}$$

where h is the heat transfer coefficient for each separate resistance, $U_A$ is the total heat transfer coefficient to gas on the catalytic side, and $U_B$ to gas on the non-catalytic site. For a typical 20 micron thick gamma alumina washcoat of 50% void volume on a metal foil of 0.25 mm thickness, the calculated values are:

$$U_A = 25.54 \text{ kcal/m}^2 \text{ hr } °C.$$

$$1/U_B = 3.915 \times 10^{-2} + 2 \times 10^{-6} + 1.4 \times 10^{-5}$$

$$U_B = 25.53 \text{ kcal/m}^2 \text{ hr } °C.$$

For typical catalyzed metal substrates, the major heat transfer resistance is in the gas film above the catalyst surface. The heat loss is therefore about equal on the catalytic and on the non-catalytic sides of the substrate.

This integral heat exchange structure will have a substrate or wall temperature given by equation (1):

$$T_{wall} = \frac{T_{gas\,inlet} + T_{adiabatic}}{2} \qquad (1)$$

The wall temperature rise will be equal to about half the difference between the inlet temperature and the theoretical adiabatic combustion temperature.

As shown above, the metal sheets may be coated on one side with catalyst, and the other surface being non-catalytic, formed into rolled or layered structures (FIGS. 1A–1C) to form long open channel structures offering low resistance to gas flow. Another alternative is formation of a corrugated metal strip (40) coated on one side with catalyst (42) can be combined with a separator strip (44) not having a catalytic coating to form the structure shown in FIG. 4A.

Figure 4A:
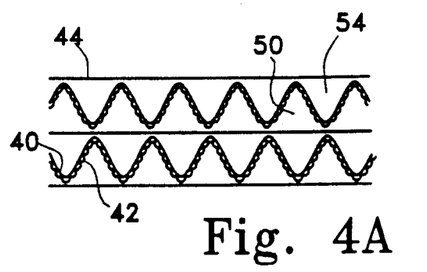
FIGS. 4A, 4B, 5, 6A, and 6B show various configurations of the inventive catalytic structure having catalytic material on a single side of the support.
Figure 4B:
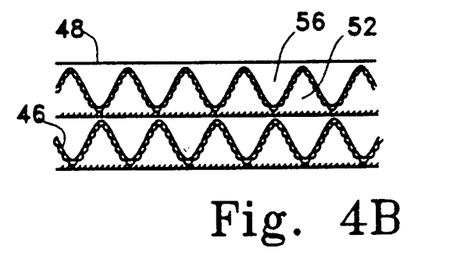

Alternatively as shown in FIG. 4B, corrugated (46) and flat strips (48) both coated with catalyst on one side prior to assembly into a catalyst structure can be combined as shown. The structures form channels with catalytic walls (30) in FIG. 4A and in FIG. 4B) and channels with non-catalytic walls (54) in FIG. 3A and 56 in FIG. 4B). These structures have the unique ability to limit the catalyst substrate temperature and outlet gas temperature.

Figure 5:
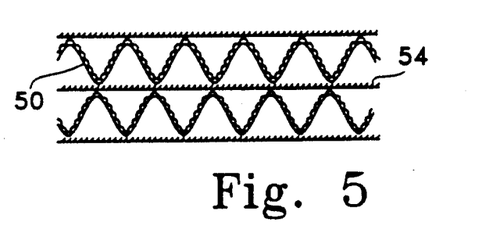

The corrugated (50) and flat sheets (54) coated on one side with catalyst can be arranged according to FIG. 5 where the catalytic surface of each sheet faces a different channel so that all channels have a portion of their walls' catalyst coated and all walls have one surface coated with catalyst and the opposite surface non-catalytic. The FIG. 5 structure will behave differently from the FIG. 3A and FIG. 3B structures. The walls of the FIG. 5 structure form an integral heat exchange but, since all channels contain catalyst, there is then a potential for all of the fuel to be catalytically combusted. As combustion occurs at the catalyst surface, the temperature of the catalyst and support will rise and the heat will be conducted and dissipated in the gas flow on both the catalytic side and the non-catalytic side. This will help to limit the temperature of the catalyst substrate and will aid the palladium temperature limiting to maintain the wall temperature at 750° C. to 800° C. at one atm of air or about 930° C. at ten atm of air. For sufficiently long catalysts or low gas velocities, a constant outlet gas temperature of 750° C. to 800° C. would be obtained for any fuel/air ratio with an adiabatic combustion temperature above approximately 800° C. at one atm of air or about 930° C. at ten atm of air.

The structures shown in FIGS. 4A and 4B have equal gas flow through each of the catalytic channels and non-catalytic channels. The maximum gas temperature rise with these structures will be that produced by 50% combustion of the inlet fuel.

Figure 6A:
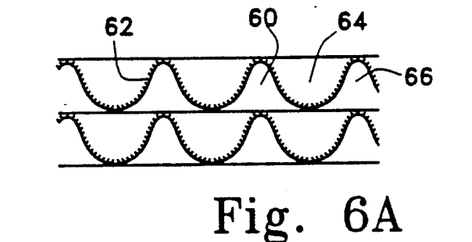
Figure 6B:
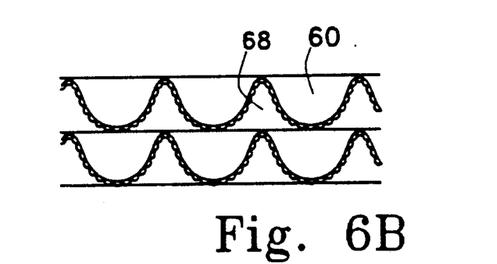

The structures shown in FIGS. 4A and 4B may be modified to control the fraction of fuel and oxygen reacted by varying the fraction of the fuel and oxygen mixture that passes through catalytic and non-catalytic channels. FIG. 6A shows a structure where the corrugated foil has a structure with alternating narrow (60) and broad (62) corrugations. Coating this corrugated foil on one side results in a large catalytic channel (64) and a small non-catalytic channel (66). In this structure approximately 80% of the gas flow would pass through catalytic channels and 20% through the non-catalytic channels. The maximum outlet gas temperature would be about 80% of the temperature rise expected if the gas went to its adiabatic combustion temperature. Conversely, coating the other side of the foil only (FIG. 6B) results in a structure with only 20% of the gas flow through catalytic channels (68) and a maximum outlet gas temperature increase of 20% of the adiabatic combustion temperature rise. Proper design of the corrugation shape and size can achieve any level of conversion from 5% to 95% while incorporating integral heat exchange. As noted above, the passageways containing the catalyst may be larger than, equal to, or smaller than the non-catalytic passageways or channels. The ratio of the areas of the catalytically active channels to the catalytically inactive channels for these channels may be from 1:20 to 20:1. The ratio of these areas will approximate the ratio of the gas flows as shown in this equation. The maximum outlet gas temperature can be calculated by equation 2 below:

$$T_{gas\,max} = T_{gas\,inlet} + [T_{adiabatic} - T_{gas\,inlet}] \times \frac{\text{catalytic gas flow}}{\text{non-catalytic gas flow}} \qquad (2)$$

To illustrate the operation of this integral heat exchange zone, assume that a partially oxidized gas from the first catalytic zone flows into the FIG. 4B structure in which the gas flow through the catalytic channels is 50% of the total flow.

Approximately half of the gas flow will pass through channels with catalytic walls (52) and half will flow through channels with non-catalytic walls (56). Fuel combustion will occur at the catalytic surface and heat will be dissipated to the gas flowing in both the catalytic and non-catalytic channels. If the entering gas is 500° C. and the fuel/air ratio corresponds to a theoretical adiabatic combustion temperature of 1300° C., then combustion of the fuel in the catalytic channels will cause the temperature of all of the flowing gases to rise. The heat is dissipated into gas flowing in both the catalytic and non-catalytic channels. The calculated L-IHE wall temperature is:

$$T_{wall} = \frac{500° \text{ C.} + 1300° \text{ C.}}{2} = 900° \text{ C.}$$

The calculated maximum gas temperature is:

$$T_{gas\ max} = 500° \text{ C.} + [1300° \text{ C.} - 500° \text{ C.}]0.5 = 900° \text{ C.}$$

However, the palladium at one atm of air pressure will limit the wall temperature to 750° C. to 800° C. and the maximum outlet gas temperature will be about <800° C. As can be seen in this case, the palladium limiting feature controls the maximum outlet gas temperature and thereby limits the wall temperature.

The situation is different at ten atms of air pressure. The palladium self-limiting temperature is about 930° C. The wall will be limited to 900° C. by the L-IHE structure. In this case, the L-IHE structure is limiting the wall and gas temperature.

The catalyst structure may be sized to maintain flow velocity to reach a bulk outlet temperature of no more than 800° C., preferably in the range of 600° C. to and most preferably between 700° C. and 800° C. The catalyst can incorporate a non-catalytic diffusion barrier layer on the catalytic material such as that described by U.S. application Ser. No. 07/617,977, filed Nov. 26, 1990.

The catalytic metal content of the composite is typically quite small, e.g., from 0.01% to about 15% by weight, and preferably from 0.01% to about 10% by weight. Although many oxidation catalysts are suitable in this application, Group VIII noble metals or platinum group metals (palladium, ruthenium, rhodium, platinum, osmium, and iridium) are preferred. The catalytic material may be one or more platinum group metals on the washcoat. More preferred are palladium (because of its ability to self-limit combustion temperatures) and platinum (because of its lower expense and excellent activity). The metals may be used singly or in mixtures. We have found that mixture of for example, palladium and platinum, produce a catalyst having the temperature limiting capabilities of palladium, although at a different limiting temperature, and the mixture is less susceptible to deactivation by reaction with impurities in the fuel or by reaction with the catalyst support.

The platinum group metals may be incorporated onto the support in a variety of different methods using noble metal complexes, compounds, or dispersions of the metal. The compounds or complexes may be water or hydrocarbon soluble. The metal may be precipitated from solution. The liquid carrier generally needs only to be removable from the catalyst carrier by volatilization or decomposition while leaving the metal in a dispersed form on the support.

Suitable platinum group metal compounds are, for example, chloroplatinic acid, potassium platinum chloride, ammonium platinum thiocyanate, platinum tetrammine hydroxide, platinum group metal chlorides, oxides, sulfides, and nitrates, platinum tetrammine chloride, platinum ammonium nitrite, palladium tetrammine chloride, palladium ammonium nitrite, rhodium chloride, and hexammine iridium chloride. If a mixture of metals is desired, they may be in water soluble form, for example, as amine hydroxides or they may be present in such forms as chloroplatinic acid and palladium nitrate when used in preparing the catalyst of the present invention. The platinum group metal may be present in the catalyst composition in elemental or combined forms, e.g., as an oxide or sulfide. During subsequent treatment such by calcining or upon use, essentially all of the platinum group metal is converted to the elemental form.

In addition to the Group VIII noble metal catalyst adjuncts, catalyst adjuncts of a Group IB metal may be desireable in certain circumstances to lower the initiation of the self-limiting temperature feature of the palladium form of the catalyst. Preferred metals are silver and gold, especially silver. This metal (or metals) may also be added by inclusion in the liquid carrier containing the platinum group metal, a complex, compound, or metallic dispersion of the catalyst adjunct. For instance, silver chloride or silver tetrammine salts may be added to the palladium solution or suspension. The catalyst adjunct metal may alternatively be added in a separate step after or before the palladium is deposited on the support although the mixing of the adjunct with the palladium on the support appears to be less complete if the adjunct is added separately. The adjunct should be added in an amount up to an equilibrium amount.

Additionally, we have found that by placing a more active catalyst, preferably palladium, on the portion of the catalyst structure which first contacts the combustible gas, the catalyst will "light off" more easily and yet not cause "hot spots" in the latter regions of the structure. The leading portion may be more active because of higher catalyst loadings, higher specific surface area, or the like.

This catalyst structure should be made in such a size and configuration that the average linear velocity of the gas through the longitudinal channels in the catalyst structure is greater than about 0.02 m/second throughout the catalytic structure and no more than about 40 m/second. The lower limit is larger than the flame front speed for methane in air at 350° C. and the upper limit is a practical one for the type of supports currently commercially available. These average velocities may be somewhat different for fuels other than methane. Slower burning fuels may permit use of a lower minimum and maximum space velocity.

EXAMPLES

These examples show the use of the inventive catalyst structure.

EXAMPLE 1

This example shows the preparation of a single sided metal monolith structure using a platinum catalyst.

A mixed oxide containing approximately 5% $SiO_2$ in gamma-alumina was calcined at 1050° C. in air to give a powder with a specific surface area of 190 $m^2/gM$. A polymer lined ball mill was loaded with 125 g of the $SiO_2Al_2O_3$ powder, 220 ml water, 10 ml of concentrated nitric acid (70% $HNO_3$), and cylindrical alumina grinding media. This mixture was milled for eight hours to produce a colloidal sol.

An Fe/Cr/Al alloy foil strip was corrugated in a herringbone pattern. The strip was then oxidized at 900° C. in air to form a rough oxide coated surface. The $SiO_2/Al_2O_3$ sol was sprayed onto a single sided foil using an air atomizer sprayer and the coated foil dried and calcined. Subsequently, the coated foil was sprayed with a solution containing platinum in a concentration of 0.042 g platinum/ml. This solution was prepared from $Pt(HN_3)_2)(NO_2)_2$ dissolved in nitric acid. Again, the foil was dried and calcined. The final foil contained approximately 2.9 $m^2/gm$ of $SiO_2/Al_2O_3$ and 0.6 $m^2/gm$ of $SiO_2/Al_2O_3$ of platinum.

EXAMPLE 2

This example is a comparative example and shows the production of a double sided metal monolith structure using a platinum catalyst.

A second catalyst was prepared in similar fashion to that shown in Example 1 except that both sides of the foil were coated with $SiO_2/Al_2O_3$ and platinum. The final composition of this catalyst contained approximately 1.7 $gm/cm^3$ of $SiO_2/Al_2O_3$ on each side and 0.3 $m^2/gM$ of platinum on each side.

EXAMPLE 3

This example compares the operation of the catalysts of Examples 1 and 2 in a combustion process and demonstrates relatively longer term stability with the single sided catalyst using integral heat exchange.

Figure 7:
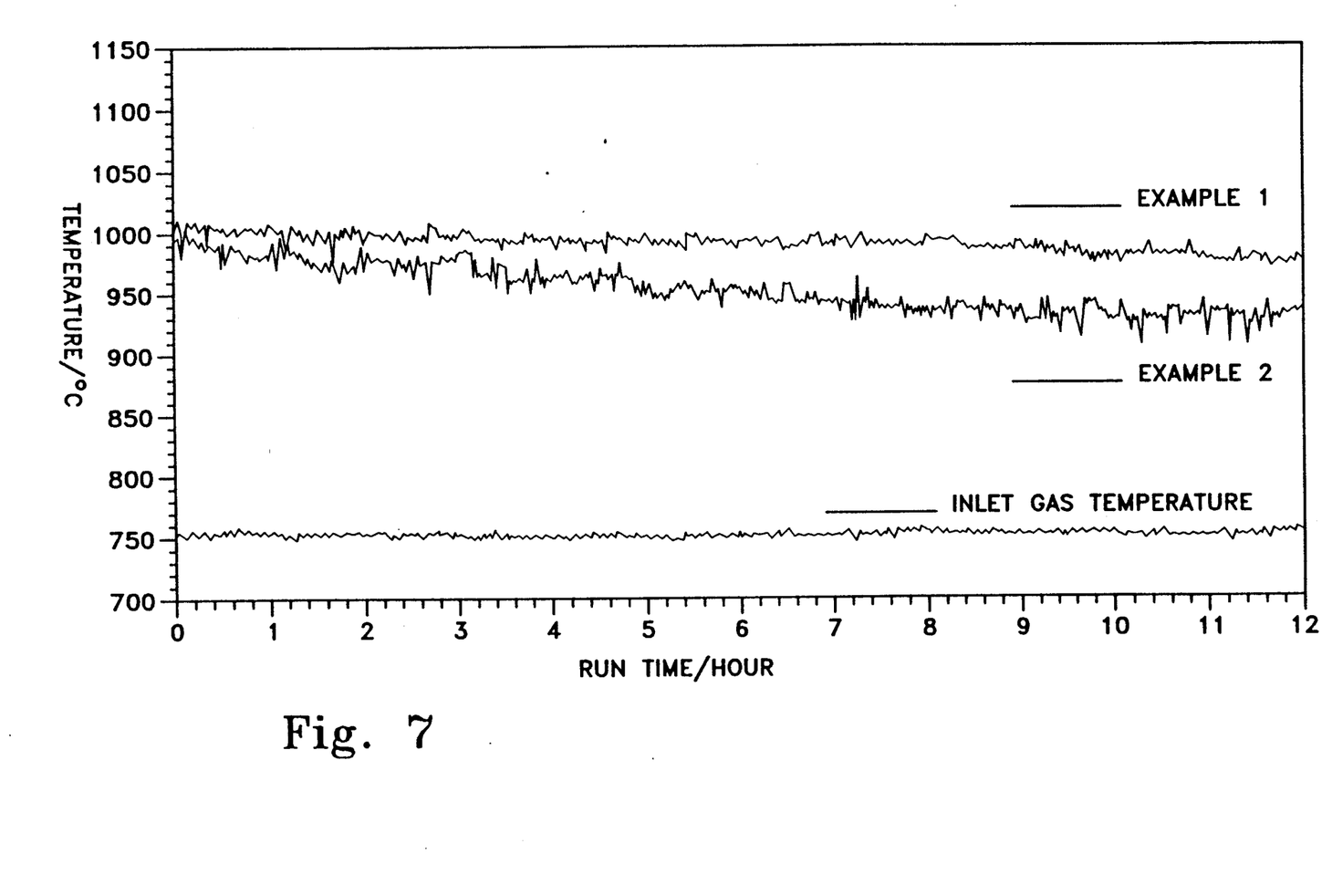
FIGS. 7 to 9 use temperature graphs showing operation of the inventive catalyst structure.

The Example 1 and 2 catalysts were rolled into a tight spiral of about two inches diameter and placed in a two inch I.D. insulated section in a combustion reactor. Air at 800 standard liters/minute (SLPM) was passed through an electric heater, a static gas mixer, and through the catalyst. Natural gas (21 SLPM) was introduced into the air stream just upstream of the gas mixer. Gas temperatures were measured before and after the catalyst with ceramic covered thermocouples suspended in the gas stream. The temperature of the incoming air/natural gas mixture or "preheat" was increased in each case to 750° C. and the catalyst performance monitored. The results are shown in FIG. 7.

The single sided catalyst shows more stable operation in that the gas outlet temperature for the single sided catalyst is constant. The gas outlet temperature for the double sided catalyst is declining even in the short twelve hour screening test shown in FIG. 7.

EXAMPLE 4

This example shows the production of a single sided metallic structure using a mixed oxide washcoat and a palladium catalyst.

A $ZrO_2/SiO_2$ powder was prepared by first mixing 20.8 g of tetraorthosilicate with 4.57 cc 2 mM nitric acid and 12.7 g of ethanol. The mixture was added to 100 g of a zirconia powder having a specific surface area of 100 $m^2/gm$. The resulting solid was aged in a sealed glass container for about a day and dried. One portion was calcined at 400° C. and another calcined at 1000° C.

A sol was prepared by mixing 152 g of the $ZrO_2/SiO_2$ powder calcined at 1000° C. and 15.2 g of the $ZrO_2/SiO_2$ powder calcined at 400° C. with 3.93 g 982 $H_2SO_4$ and 310 cc of distilled water. This mixture was milled using $ZrO_2$ grinding media for eight hours. Colloidal silica (11.9 g) was added to the ball mill and the milling was then continued for 30 minutes.

A mixture of palladium salts and $ZrO_2/SiO_2$ was then produced. About 100 g of $ZrO_2/SiO_2$ sol was mixed with 84 ml of 0.083 g palladium/ml solution prepared from $Pd(HN_3)_2(NO_2)_2$ dissolved in nitric acid. The pH of the solution was adjusted to 9.0, 1.26 g of $N_2H_4$ was added with stirring, and the pH was again adjusted to 3.0. An amount (5.4 g) of a 34% colloidal silica sol was added to the mixture.

The final sol was then sprayed onto one side of a corrugated 2 inch wide steel (Camet) foil strip. The foil had been heated in air to produce a rough oxidic surface. The sprayed foil was wound into a tight spiral coil having about 320 cells per square inch. The rolled structure was dried and then calcined at 950° C.

Figure 8:
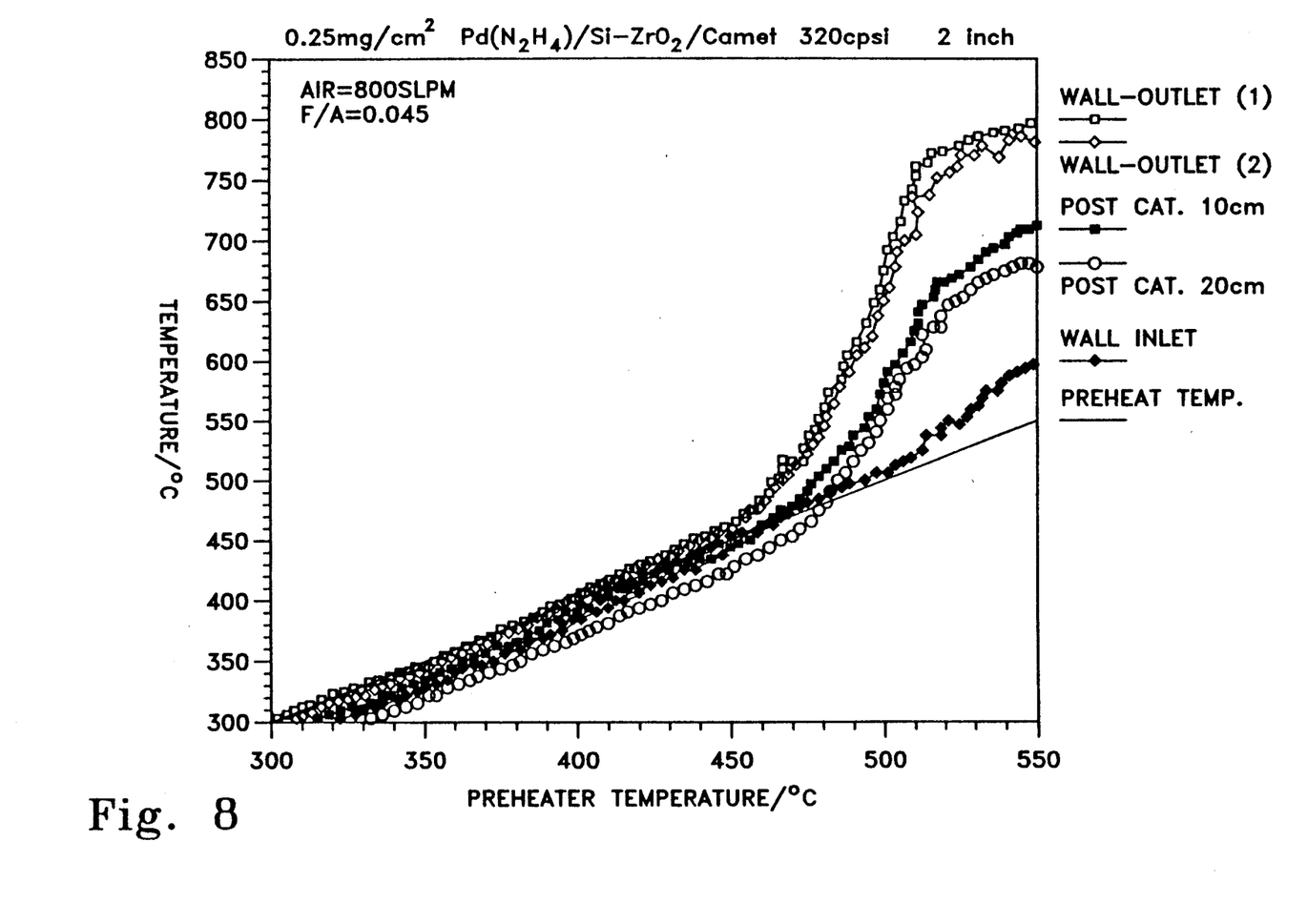

The rolled structure was placed in the combustion apparatus discussed above in Example 3. Air was introduced into the catalyst at 800 SLPM and methane was introduced to produce a fuel/air (F/A) ratio of 0.045. The temperature of the mixture entering the catalyst was slowly increased. As may be seen from FIG. 8, the catalyst began to catalyze the combustion reaction at about 475° C. and was seer-sustaining just about that point. The palladium self-limiting phenomenon may be observed in the upper portion of the wall outlet curve in FIG. 8. The temperature curve flattened at about 780° C. even though the preheat temperature continued to rise.

Figure 9:
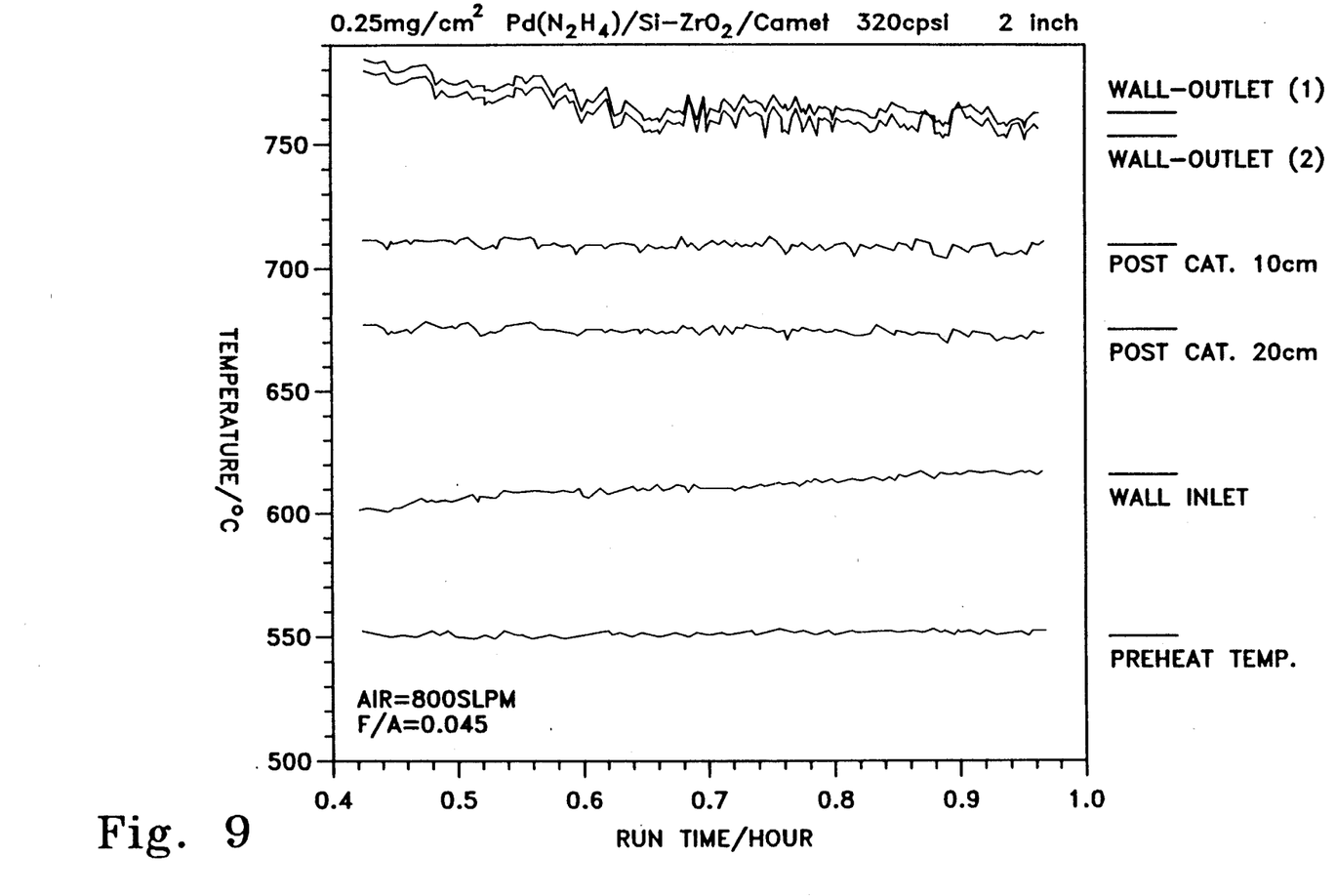

FIG. 9 shows steady state operation after catalyst stabilization. The preheat temperature was constant at 550° C. The catalyst operation was stable for the period shown.

The invention has been disclosed by direct description. Others having ordinary skill in this art will recognize equivalent variations of the claimed invention which will be within the spirit of the appended claims.

We claim as our invention:

1. A catalyst structure comprising a metallic catalyst support comprising aluminum, a high temperature metal alloy, stainless steel, or an aluminum-containing steel having a multitude of longitudinal passageways adapted for the passage of combustible gas and having interior surfaces where at least a portion but not all of the interior surfaces are coated with a catalytic material suitable for oxidizing the combustible gas, and the interior surfaces coated with catalytic material are in heat exchange relationship with interior surfaces not coated with a catalytic material.

2. The catalyst structure of claim 1 where some passageways contain catalytic material.

3. The catalyst structure of claim 1 where each of the passageways contains catalytic material.

4. The catalyst structure of claim 1 where the metallic catalyst support comprises an aluminum-containing steel.

5. The catalyst structure of claim 4 wherein the metallic catalyst support additionally comprises a washcoat of zirconia, titania, alumina, silica, or other refractory metal oxide on at least a portion of the support.

6. The catalyst structure of claim 5 wherein the washcoat comprises alumina.

7. The catalyst structure of claim 5 where the washcoat comprises zirconia.

8. The catalyst structure of claim 5 where the washcoat comprises a mixture of at least two of zirconia, titania, alumina, and silica.

9. The catalyst structure of claim 8 where the washcoat comprises a mixture of zirconia and silica.

10. The catalyst structure of claim 4 where the catalytic material is one or more platinum group metals.

11. The catalyst structure of claim 5 where the catalytic material is one or more platinum group metals on the washcoat.

12. The catalyst structure of claim where 5 the catalytic material comprises platinum.

13. The catalyst structure of claim 6 where the catalytic material comprises platinum.

14. The catalytic structure of claim 5 where the catalytic material comprises palladium.

15. The catalytic structure of claim 7 where the catalytic material comprises palladium.

16. The catalytic structure of claim 9 where the catalytic material comprises palladium.

17. The catalytic structure of claim 5 where the catalytic material comprises palladium and platinum.

18. The catalyst structure of claim 4 wherein the passageways containing catalyst are relatively larger than the passageways not containing catalyst.

19. The catalyst structure of claim 4 where the passageways containing catalyst are relatively smaller than the passageways not containing catalyst.

20. The catalyst structure of claim 4 where the passageways containing catalyst are relatively of equal size to the passageways not containing catalyst.

21. The catalyst structure of claim 18 where the ratio of the open area of the passageways containing catalyst to the open area of the passageways not containing catalyst is between 1:20 and 20:1.

22. The catalyst structure of claim 19 where the ratio of the open area of the passageways containing catalyst to the open area of the passageways not containing catalyst is between 1:20 and 20:1.

23. The catalyst structure of claim 20 where the ratio of the open area of the passageways containing catalyst to the open area of the passageways not containing catalyst is between 1:20 and 20:1.

24. The catalyst structure of claim 4 where the metallic catalyst support comprises a spiral roll of corrugated sheet.

25. The catalyst structure of claim 4 where the catalyst support is a rolled spiral comprising corrugated sheet and a spacer sheet.

26. The catalyst structure of claim 4 where the metallic catalyst support is in a herringbone pattern.

27. The catalyst structure of claim 4 where the metallic catalyst support is assembled comprising generally parallel alternating layers of corrugated and flat spacer sheets.

28. The catalyst structure of claim 1 where a portion of the surfaces containing catalyst contain a higher activity catalyst.

29. A catalyst structure comprising a catalyst support of an aluminum-containing steel, having a multitude of longitudinal passageways adapted for the passage of combustible gas and having interior surfaces, where at least a portion but not all of the interior surfaces are coated with a washcoat comprising alumina, zirconia, silica, titania, or the other refractory metal oxide and a catalytic material comprising a platinum group metal which is suitable for oxidizing the combustible gas and those coated surfaces are in a heat exchange relationship with interior surfaces not coated with a catalytic material.

30. The catalyst structure of claim 29 where some of the passageways contain catalytic material.

31. The catalyst structure of claim 29 where of each the passageways contains catalytic material.

32. The catalyst structure of claim 29, 30, or 31 where the washcoat comprises alumina.

33. The catalyst structure of claim 29, 30, or 31 where the washcoat comprises zirconia.

34. The catalyst structure of claim 29 where the passageways containing catalyst are relatively larger than the passageways not containing catalyst.

35. The catalyst structure of claim 29 where the passageways containing catalyst are relatively smaller than the passageways not containing catalyst.

36. The catalyst structure of claim 29 where the passageways containing catalyst are relatively of equal size to the passageways not containing catalyst.

37. The catalyst structure of claim 29 where the metallic catalyst support comprises a spiral roll of corrugated sheet.

38. The catalyst structure of claim 29 where the catalyst support is a rolled spiral comprising corrugated sheet and a spacer sheet.

39. The catalyst structure of claim 37 where the metallic catalyst support is in a herringbone pattern.

40. The catalyst structure of claim 29 where the metallic catalyst support is assembled comprising generally parallel alternating layers of corrugated and flat spacer sheets.

41. The catalyst structure of claim 29 where a portion of the surfaces containing catalyst contain a higher activity catalyst.

* * * * *